April 21, 1970     D. H. KRAFT     3,507,373
LOW INERTIA CLUTCH AND FLYWHEEL ASSEMBLY
Filed Jan. 12, 1968     2 Sheets-Sheet 1

INVENTOR.
DERALD H. KRAFT
BY
Meyer, Tilberry & Body
ATTORNEYS.

April 21, 1970     D. H. KRAFT     3,507,373

LOW INERTIA CLUTCH AND FLYWHEEL ASSEMBLY

Filed Jan. 12, 1968     2 Sheets-Sheet 2

INVENTOR.
DERALD H. KRAFT

BY
*Meyer, Tilberry & Body*
ATTORNEYS.

United States Patent Office 3,507,373
Patented Apr. 21, 1970

3,507,373
LOW INERTIA CLUTCH AND FLYWHEEL ASSEMBLY
Derald H. Kraft, Canton, Ohio, assignor to E. W. Bliss Company, Canton, Ohio, a corporation of Delaware
Filed Jan. 12, 1968, Ser. No. 697,528
Int. Cl. F16d *13/40, 25/06*
U.S. Cl. 192—85      8 Claims

ABSTRACT OF THE DISCLOSURE

A clutch and flywheel assembly in which the flywheel comprises the housing for the clutch and all elements of the clutch are supported within the axial and radial dimensions of the flywheel.

---

This invention relates to clutches and more particularly to a clutch and flywheel combination which is designed for use in power presses having low inertia requirements.

Although this invention will be disclosed with particular reference to use in a power press, it is to be understood that the principles of the invention have broader application and may be employed in any type of apparatus which employs a rotating shaft and has relatively low flywheel energy requirements.

It is conventional in the design of power presses to employ a crankshift on which there is rotatably supported a flywheel. The flywheel, when coupled to the shaft, rotates the shaft and provides a source of stored energy in a manner well known in the art. Normally, the flywheel is connected to the shaft through the use of a friction clutch which may take various shapes but which traditionally as employed a clutch housing and a clutch disc which may selectively be coupled to the flywheel. One such prior art arrangement employs a clutch housing which is attached to and forms an extension from the flywheel with the clutch parts being disposed in the housing.

It is highly desirable to standardize to the extent possible the type of clutch or clutches used on a line of presses produced by any particular press manufacturer. Since a wide range of presses having varying press capacities and constructions are normally produced by the manufacturer, there are many problems to be considered and overcome in attaining this standardization of parts. One such problem which arises is the varying flywheel energy and inertia requirements for presses of various capacities.

The flywheel energy requirements for the smaller presses normally is so low that the standard clutch elements which are employed on the larger presses furnish an adequate flywheel effect when revolving at their normal torque radius. Consequently, a separate flywheel is not required other than to couple the press drive to the crankshaft and to have some form of rotating member to support the clutch elements. Desirably, in the case of small presses, the rotating member on which the clutch elements are supported should not significantly contribute to the energy or inertia of the system. However, the rotating member must have a sufficient diameter so that an adequate torgue radius is available to transmit the drive through the clutch to the crankshaft. Moreover, if any degree of standardization is to be achieved, the clutch parts used in the smaller presses should be capable of use in larger presses as well.

It is a primary object of this invention to provide a low inertia clutch assembly which employs a clutch that is equally adaptable to both large and small presses but in which a separate clutch housing has been eliminated.

In accordance with the principal aspect of this invention, it is contemplated that the clutch employed in the press will be combined with the flywheel in such a manner that the flywheel functions as a clutch housing, thereby eliminating the necessity for the clutch housing heretofore employed.

More specifically, it is contemplated that the flywheel and clutch assembly will be so designed that a standard clutch of the type which may be employed in presses of larger capacities may also be used on small capacity presses without increasing the inertia in the system beyond permissible limits.

In accordance with another aspect of the invention, it is contemplated that the flywheel and clutch assembly will be so designed that the clutching capacity of the system may be readily varied to accommodate varying conditions.

These aspects of the invention are embodied in a clutch and flywheel assembly in which the flywheel has a hub, a rim radially spaced from the hub and a web interconnecting the rim with the hub to form a one-piece flywheel. The rim has an axial dimension which is substantially greater than the axial dimension of the web whereby a portion of the rim projects axially beyond at least one axial face of the web thereby to define a radially extending recess terminating at its outer extremity at the rim. A clutch unit is disposed in the recess with the axial dimensions of the clutch unit being no greater than the axial dimension of the projecting portion of the rim. All elements of the clutch operator are formed internally of the flywheel.

More specifically, the invention contemplates a clutch unit in which one friction member is supported by the web of the flywheel and the other friction member is supported by the axially outer end of the rim. A fluid chamber is formed in the web with a piston in the chamber and connected to the first friction member to move the one member toward the other member. The clutch unit is of limited arcuate extent with a pair of diametrically opposed radially extending recesses formed in the web and rim at either end of the clutch unit.

It is an object of this invention to provide a clutch arrangement particularly adapted for use in small capacity presses.

Another object of this invention is to provide a clutch arrangement for small capacity presses in which the clutch capacity of the press may be readily varied.

Still another object of this invention is to provide a flywheel and clutch arrangement which is inexpensive to manufacture but which produces a system which may be readily varied to suit the particular energy requirements of the press.

Other objects, features and aspects of the invention will become more apparent upon a complete reading of the following description when read in conjunction with the attached drawings which illustrate but one preferred embodiment of the invention.

Referring to the drawings wherein like reference numerals indicate like parts in the various views.

Figure 3:
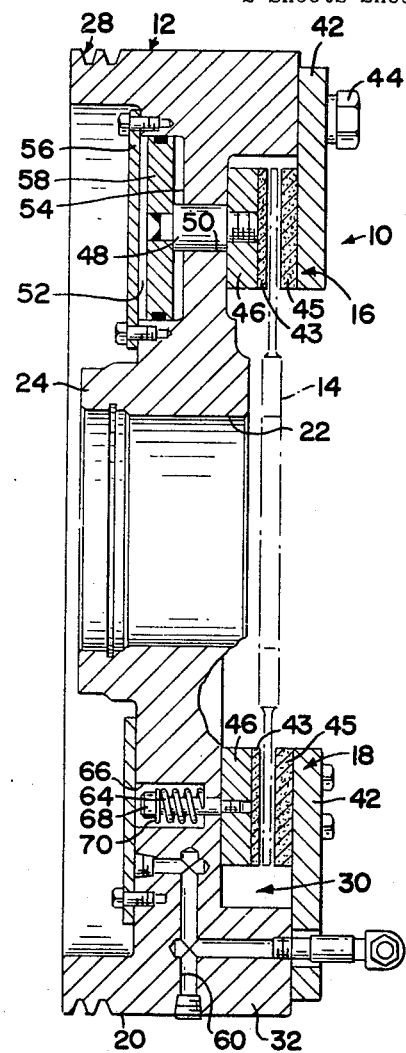
FIGURE 3 is a sectional view showing the assembly of the clutch to the flywheel.

Referring now to the drawings and particularly FIGURE 3, there is illustrated the flywheel and clutch assembly, generally indicated by the reference numeral 10, comprising the instant invention. The assembly 10 includes a flywheel casting 12, a clutch disc 14 adapted to be secured to a driven shaft, not shown, and clutch units 16, 18 carried by the flywheel at opposed positions thereof with the clutch units being adapted to grip the disc 14 therebetween to transmit the rotary motion of the flywheel to the crankshaft in a manner well known in the art. It is important to note that this arrangement of elements provides an extremely compact assembly in which the clutch units are directly supported on the flywheel and disposed within the axial dimensions of the flywheel. With this relationship, the flywheel thus forms the housing for the clutch, as will be described in more detail hereinafter, thereby eliminating the need for a separate clutch housing which would contribute to the inertia of the drive system.

Referring first to the flywheel 12, the flywheel comprises a casting having a rim 20 which constitutes the usual flywheel mass rotating at a torque radius measured from the centerline of the shaft which passes through an opening 22 in the flywheel hub 24. A web portion 26 interconnects the rim 20 with the hub 24. Appropriate means 28 are provided on the outer periphery of the rim 20 to connect the flywheel with a source of motive power to cause rotation of the flywheel.

Figure 1:
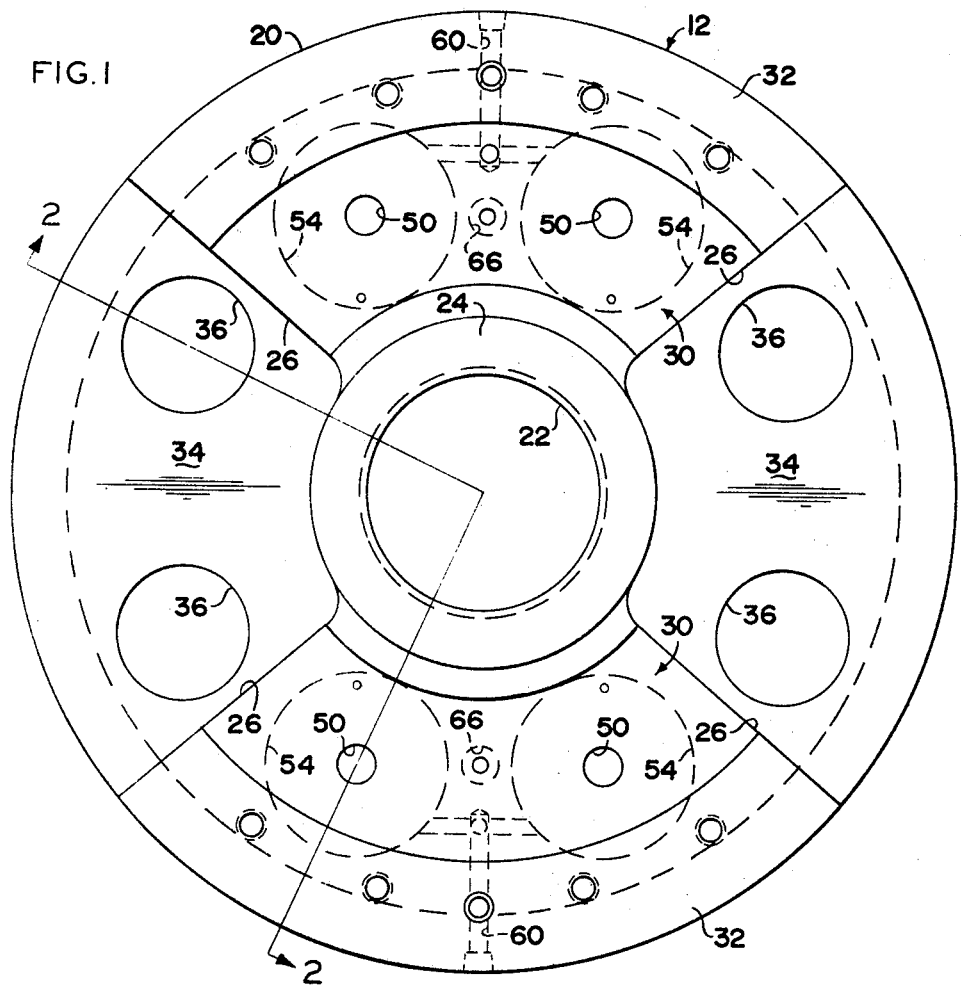
FIGURE 1 is a front elevation view of a flywheel machined for use in the flywheel clutch assembly of the instant invention.
Figure 2:
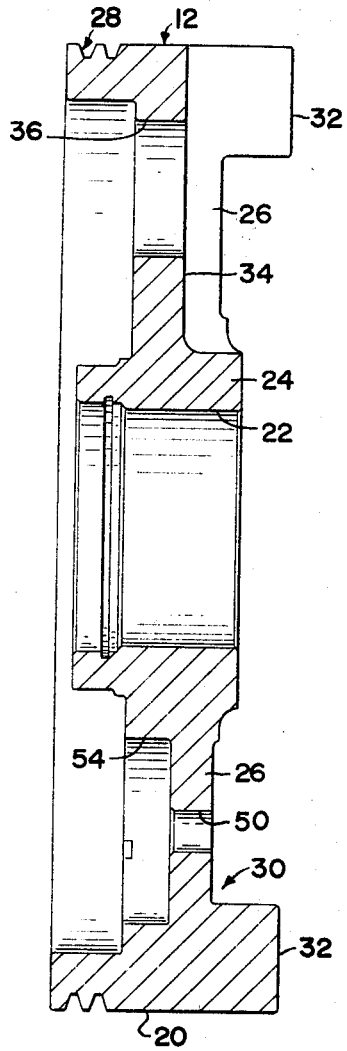
FIGURE 2 is a sectional view along line 2—2 of FIGURE 1.

The hub 24 has an axial dimension which is less than the axial dimension of the rim 20 but which is substantially greater than the axial dimension of the web 26. As shown best in FIGURES 1 and 2, radially extending arcuate recesses 30 are defined in one axial face of the flywheel 12 with the recesses being defined by the web 26 and rim 20. Thus, the recesses extend radially outwardly from the hub 24 to the inner periphery of the rim 20, thereby defining an axially extending projection 32 on the rim 20. As is apparent from FIGURE 1, the arcuate recesses 30 are formed at diametrically opposed positions on the circumference of the flywheel.

Formed in the same face of the flywheel as recesses 30 are a pair of radially inwardly extending arcuate recesses 34. The recesses 34 are formed at diametrically opposed positions on the flywheel with the recesses 34 commencing at the outer periphery of the rim 20, extending through a portion of the web 26 and terminating at their inner ends at the hub 24. The recesses 34 extend through rim 20 thereby interrupting the circumferential extent of projection 32 and dividing the projection into segments equal in arc length to the arc of recesses 30. As is apparent from FIGURE 1, the recesses 34 alternate with the recesses 30 with the combined recesses covering the entire axial face of flywheel 12. Apertures 36 are formed in the web 26 and provide communication between the recesses 34 and the opposite axial face of the flywheel 12. A pair of apertures 36 are shown for each recess but it will be appreciated that more or less apertures may be employed depending on the inertia requirements of the system.

Figure 4:
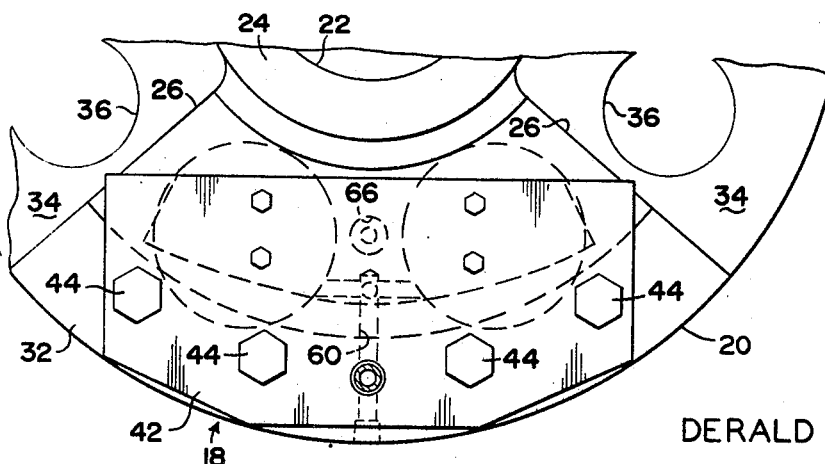
FIGURE 4 is a partial elevation view showing the relationship of one clutch unit to the flywheel.

It is contemplated that the flywheel 12 will be employed with a clutch of the spot or caliper type wherein the friction members which engage the clutch disc do so only over a limited portion of the periphery of the disc. More specifically, it is contemplated that the caliper type clutch units will be positioned in recesses 30 and between the arcuate radial recesses 34 in the flywheel 12. Thus, referring to FIGURE 4, there is illustrated one such clutch unit, indicated generally by the reference numeral 18, positioned within the recess 30 and between the radial recesses 34. Since it is necessary that a balanced construction of the flywheel be retained, it is contemplated that a second corresponding clutch unit 16 would be employed on the diametrically opposed side of the flywheel in recess 30.

The flywheel casting 12 is specifically designed and machined to accommodate the clutch units and provide a support and housing therefore in the following manner. A cover plate 42 is secured by bolts 44 to the rim 20 of the flywheel 12, the cover plate 42 being limited in arcuate extent so that it overlies only the recess 30 between the radial recesses 34. A separate cover plate is employed for each recess 30 and each of the two clutch units 16, 18 thereby minimizing the inertia of the system. The cover plate 42 extends radially inwardly to overlie the radially outer portion of the associated recess 30 and thereby defines a partially enclosed clutch chamber into which the clutch disc 14 extends.

The two clutch units 16, 18 are identical in construction so that although the following description refers to but one of the clutch units, it is to be understood that the description applies to the other clutch unit as well. Positioned in the clutch chamber on opposite sides of the disc 14 are friction members or gripping elements 43, 45. The gripping element 45 comprises a friction material secured to the inner axial surface of the plate 42. The gripping element 43 is likewise comprised of a friction material bonded to a backing plate 46, with the plate being threadedly connected to a rod 48 extending through an aperture 50 formed in the web 26 of the flywheel 12. A fluid chamber 52 is formed in the flywheel by a recess 54 formed in web 26 on the side of the web opposite to recess 30. A cover plate 56 is secured, as by bolts, to the flywheel and encloses the recess 54 to define a closed chamber. A piston 58 is disposed in the fluid chamber and is connected to the projecting end of the rod 48. Appropriate passages 60 are formed in the flywheel casting and communicate at their inner end with the fluid chamber 52 so that as fluid is introduced to the chamber 52, the plate 46 and its associated friction material 43 is advanced toward the clutch disc 14 whereby the clutch disc is gripped between the friction elements 43 and 45 thereby coupling the shaft to the flywheel. In the embodiment of the clutch units illustrated, a pair of fluid chambers 52 are formed in the flywheel and a pair of pistons 58 are employed to operate the clutch. It will be appreciated, however, that only one such fluid operator, or more than two fluid operators, might be employed depending upon the particular circumstances and the desired clutch capacity.

The clutch is normally spring biased to a released position by springs 64. The springs are disposed in recesses 66 in the flywheel 12 and encircle bolts 68. One end of each bolt 68 is threadedly connected to the backing plate 46 with the other end of the bolt being disposed in the recess 66. The spring acts between a washer abutment 70 secured to the bolt 68 and the bottom wall of the recess 66 to bias the gripping element 43 away from the clutch disc 14.

From the above-described assembly, it is apparent that the operating elements of the two clutch units are wholly enclosed within a one piece flywheel with the only parts external to the flywheel being the two cover plates 42. With such arrangement, there is no clutch housing to add to the inertia of the drive system. Moreover, because of the particular design of the flywheel, the inertia of the system may be varied depending upon the arcuate size and axial depth of the radial recesses 34 and the number of apertures 36 which compensate for such additional weight as may be contributed by the clutch units carried on the flywheel. It should also be noted that the components of the clutch units are essentially standard components present in most caliper type clutches with the exception that many parts normally present in such clutches have been eliminated by employing the flywheel casting as the housing, not only for the clutch elements, but for the fluid operator as well. Thus, by machining the flywheel to accommodate the fluid operator for the clutch, a separate housing has been totally eliminated.

Having thus described my invention, I claim:

1. A clutch and flywheel assembly for coupling a flywheel to a shaft, said assembly comprising:

a flywheel having a hub, a rim radially spaced from said hub and a web interconnecting said rim with said hub to form a one piece flywheel, a radially extending, axially opening recess formed in one axial face of said flywheel with said recess terminating radially inward of said rim,
a clutch unit positioned in said radial recess,
said clutch unit having an arcuate extent substantially less than the circumference of said flywheel, and
radially extending recess means formed in said rim and said web,
said recess means being circumferentially spaced from said clutch unit.

2. The assembly of claim 1 wherein said radially extending recess means are formed in said rim and said web at opposite ends of said clutch unit.

3. The assembly of claim 1 and further including apertures in the portion of said web having said radially extending recesses.

4. The assembly of claim 1 wherein said clutch unit comprises:
a first friction member supported by said web radially inward of said rim,
a second friction member carried by said flywheel and spaced axially from said first friction member,
said first and second friction members being disposed within the axial limits of said rim, and
means on said flywheel operative to move one of said friction members toward the other of said friction members thereby to clamp a clutch disc therebetween.

5. The assembly of claim 4 wherein said second friction member is carried by a plate connected to said rim with said plate overlying said recess.

6. The assembly of claim 4 wherein said operative means comprises a recess formed in the other axial face of said flywheel and defining a fluid chamber,
piston means in said fluid chamber,
an aperture in said web communicating with said fluid chamber, and
means extending through said aperture connecting said first friction member with said piston means.

7. The assembly of claim 6 and further including a second aperture formed is said web, and
biasing means in said second aperture connected to said first friction member.

8. The assembly of claim 5 wherein said radially extending recess means are positioned on either side of said chamber defining recess.

References Cited

UNITED STATES PATENTS

| | | |
|---|---|---|
| 1,968,130 | 7/1934 | Criley. |
| 2,089,733 | 8/1937 | Criley. |
| 2,785,781 | 3/1957 | Johansen. |
| 2,862,589 | 12/1958 | Porteous et al. _____ 192—18.1 |
| 3,199,646 | 8/1965 | McBride. |

MARK M. NEWMAN, Primary Examiner

U.S. Cl. X.R.

192—79.13, 70.14, 91